United States Patent

Brooks et al.

Patent Number: 5,305,356
Date of Patent: Apr. 19, 1994

[54] INSPECTION DEVICE

[75] Inventors: Raymond J. Brooks, Ontario; John M. Gay, Pittsford; Bruce A. Weir, Ontario; Paul E. McEntee, Rochester; Lauren Blood, Livonia Center, all of N.Y.

[73] Assignee: Brooks Support Systems, Inc., Williamson, N.Y.

[21] Appl. No.: 882,847

[22] Filed: May 14, 1992

[51] Int. Cl.$^5$ .................................. G21C 17/00
[52] U.S. Cl. ............................ 376/249; 376/248
[58] Field of Search ................ 376/249, 248; 976/DIG. 210, DIG. 213; 364/513, 527, 525; 368/210, 209, 479, 226

[56] References Cited

U.S. PATENT DOCUMENTS

| | | | |
|---|---|---|---|
| D. 303,120 | 8/1989 | Cavdek | D16/242 |
| D. 303,269 | 9/1989 | Yamaguchi | D16/245 |
| 1,971,486 | 8/1934 | Jennings et al. | 88/16 |
| 2,165,512 | 7/1939 | Schofield | 248/124 |
| 2,293,207 | 8/1942 | Haskin et al. | 88/16 |
| 2,700,523 | 1/1955 | Pollard | 248/181 |
| 2,703,691 | 3/1955 | Minnis | 248/161 |
| 2,957,365 | 10/1960 | Sachtler | 74/572 |
| 3,066,969 | 12/1962 | Camac | 294/66 |
| 3,075,113 | 1/1963 | Soar | 313/17 |
| 3,103,257 | 9/1963 | Richards | 182/2 |
| 3,114,799 | 12/1963 | Waters et al. | 178/7.2 |
| 3,164,838 | 1/1965 | Heinrich | 352/69 |
| 3,399,614 | 9/1968 | Fischer | 95/86 |
| 3,437,753 | 4/1969 | Stith | 178/7.81 |
| 3,636,778 | 1/1972 | Huffstetler | 73/67.8 R |
| 3,780,571 | 12/1973 | Wiesener | 73/67.8 S |
| 3,790,002 | 2/1974 | Germond et al. | 214/1 CM |
| 3,926,040 | 12/1975 | Cowell | 73/67.8 S |
| 3,952,982 | 4/1976 | Lewis | 248/124 |
| 3,987,666 | 10/1976 | Blanc et al. | 73/67.8 X |
| 4,018,345 | 4/1977 | Formanek et al. | 214/1 BB |
| 4,070,561 | 1/1978 | Shunichi et al. | 364/104 |
| 4,205,939 | 1/1980 | Reyes | 414/728 |
| 4,213,732 | 7/1980 | Cooper, Jr. | 414/728 |
| 4,222,540 | 9/1980 | King et al. | 248/205 R |
| 4,231,419 | 11/1980 | Gugel | 165/11 A |
| 4,285,242 | 8/1981 | Braithwaite | 73/623 |
| 4,285,243 | 8/1981 | Collingwood | 73/623 |
| 4,302,772 | 11/1981 | Gillot | 358/100 |
| 4,325,026 | 4/1982 | Cooper, Jr. et al. | 324/232 |
| 4,341,452 | 7/1982 | Korling | 354/293 |
| 4,344,146 | 8/1982 | Davis et al. | 364/552 |
| 4,406,856 | 9/1983 | Wilkins et al. | 376/260 |
| 4,424,531 | 1/1984 | Elter et al. | 358/100 |
| 4,425,296 | 1/1984 | Adamowski et al. | 376/245 |
| 4,429,329 | 1/1984 | Clemens et al. | 358/100 |
| 4,432,931 | 2/1984 | Lockett | 376/248 |
| 4,457,610 | 7/1984 | Kawazoe | 354/293 |
| 4,508,063 | 4/1985 | Monne | 122/504 |
| 4,520,673 | 6/1985 | Muller et al. | 73/623 |
| 4,523,470 | 6/1985 | Muller et al. | 73/623 |
| 4,530,580 | 7/1985 | Ueda et al. | 354/82 |
| 4,569,230 | 2/1986 | Asty et al. | 73/623 |
| 4,575,185 | 3/1986 | Wentzell et al. | 350/96.26 |
| 4,581,938 | 4/1986 | Wentzell | 73/623 |
| 4,613,476 | 9/1986 | Jacobson | 376/249 |
| 4,653,971 | 3/1987 | Bernardin | 414/8 |
| 4,655,567 | 4/1987 | Morley | 352/243 |

(List continued on next page.)

Primary Examiner—Donald P. Walsh
Assistant Examiner—Meena Chelliah
Attorney, Agent, or Firm—Synnestvedt & Lechner

[57] ABSTRACT

A device suited for inspecting selected positions of a nuclear power plant. The invention comprises a boom for extending to a position in a nuclear power station to be inspected, and a video camera affixed to the boom for permitting the visual inspection of the position to be inspected. In preferred embodiments, the video camera is affixed to a pan and tilt mechanism which may be adjusted by a remote joystick or by a control box situated on the boom. The video camera includes an autofocus feature.

11 Claims, 4 Drawing Sheets

| | | | | | |
|---|---|---|---|---|---|
| 4,657,728 | 4/1987 | Coppa et al. | 376/248 | | |
| 4,661,309 | 4/1987 | Hayes | 376/248 | | |
| 4,664,873 | 5/1987 | Hendrich et al. | 376/260 | | |
| 4,668,981 | 5/1987 | Egger | 358/100 | | |
| 4,672,741 | 6/1987 | Zafred et al. | 29/726 | | |
| 4,673,027 | 6/1987 | Vermaat | 165/11.2 | | |
| 4,673,268 | 6/1987 | Wheeler et al. | 352/243 | | |
| 4,702,878 | 10/1987 | Klug et al. | 376/249 | | |
| 4,756,867 | 7/1988 | Blocquel | 376/248 | | |
| 4,757,258 | 7/1988 | Kelly, Jr. et al. | 324/220 | | |
| 4,760,876 | 8/1988 | Minogue | 165/11.2 | | |
| 4,764,334 | 8/1988 | King et al. | 376/248 | | |
| 4,795,606 | 1/1989 | Fenemore et al. | 376/248 | | |
| 4,849,778 | 7/1989 | Samuelson | 354/81 | | |
| 4,855,838 | 8/1989 | Jones et al. | 358/229 | | |
| 4,872,757 | 10/1989 | Cormack et al. | 356/376 | | |
| 4,890,713 | 1/1990 | Pagano | 192/142 R | | |
| 4,919,194 | 4/1990 | Gery et al. | 165/1 | | |
| 4,941,106 | 7/1990 | Krieger | 364/513 | | |
| 4,945,979 | 8/1990 | Cullen et al. | 165/76 | | |
| 4,963,903 | 10/1990 | Cane | 354/81 | | |
| 4,967,092 | 10/1990 | Fraignier et al. | 250/560 | | |
| 4,984,598 | 1/1991 | Gemma | 134/166 R | | |
| 4,984,627 | 1/1991 | LeBourgeois | 165/11.2 | | |
| 5,025,854 | 6/1991 | Richter et al. | 165/11.2 | | |
| 5,065,249 | 11/1991 | Horn et al. | 358/229 | | |
| 5,073,824 | 12/1991 | Vertin | 358/210 | | |

OTHER PUBLICATIONS

INSPECTION DEVICE

FIELD OF THE INVENTION

The present invention is directed to the field of inspection devices and methods. In particular, the present invention is directed to nuclear power plant inspection devices.

BACKGROUND OF THE INVENTION

Nuclear power plants typically contain three major components as shown in FIG. 1: a reactor which produces superheated water which is transported to one or more steam generators; the one or more steam generators which generate steam; and a power turbine, driven by the generated steam, which produces electrical power. Nuclear power plants may have miles of pipes and ducts which must be inspected and examined for corrosion, leakage and damage. These regions include the reactor bowl, the tube sheet, support plates and the tubing within the steam generator.

It is particularly difficult to inspect all areas of the plant including the primary bowl and steam generator. These areas are often highly radioactive and may leak contaminated liquids. Typically, direct human inspection of the key areas of the steam generator and reactor bowl is limited to several minutes per six-month period.

There are a number of issued patents which disclose devices for nuclear power plant inspection and repair. U.S. Pat. No. 4,673,027 discloses a device for inspecting and repairing the tubes of a nuclear reactor steam generator. The device includes a manipulator which is insertible in the chamber and which may be locked onto the tube sheet for supporting remotely controlled and monitored inspection instruments and tools. The manipulator includes a support leg which is adjustable in length in an axial direction, a main arm connected to and movable relative to the support leg and an equipment carrier which is connected to the main arm.

U.S. Pat. No. 4,653,971 discloses a device for selectively positioning a tool carried by a vehicle which moves on a perforated plate, while the device utilizes an elbow which swings a telescoping arm into position. Similarly, U.S. Pat. No. 4,945,979 disclosed an improved robotic arm for effecting a tube plugging operation. The system also includes an elbow control mechanism.

U.S. Pat. No. 4,205,939 discloses an apparatus for remotely repairing the tubes in a steam generator. The device includes a boom pivotally mounted on a column and a system for rotating the column and the boom therewith. The disclosed device further includes a tool which is operable on the tubes.

U.S. Pat. No. 4,231,419 discloses a manipulator for inspecting and repairing the tubes of heat exchangers. An inspection arm is inserted and removed through a lead-in nozzle and a swivel arm carries an extendable and retractable mouthpiece carrier with a mouthpiece which can be aligned into the tube openings. U.S. Pat. No. 4,919,194 discloses a method of positioning a robot for inspecting and maintaining the steam generator within a nuclear plant.

U.S. Pat. No. 4,302,772 discloses a device for television inspection of an inner surface of a closed cylindrical vessel having vertical access and an access hole in the vessel's upper part. The device includes a television camera and at least one flood light for lighting an area to be inspected. The camera is suspended from a flexible tube which is held rigid under torsion and through which pass electricity supply cables for the camera and floodlight.

U.S. Pat. No. 4,424,531 discloses an inspection device for inspecting internal spaces in nuclear reactor installations. The device includes a camera arranged on an adjustable tube U.S. Pat. No. 4,967,092 discloses an apparatus for optically checking the inner profile of a tube. The apparatus includes a probe which is positioned in, and movable longitudinally within, the tube.

Finally, U.S. Pat. No. 4,702,878 discloses a device for searching and retrieving objects on a tube sheet of a steam generator. The device includes a sled having a probe and a gripper which is connected to a flexible tube having control means.

While each of the above mechanisms have been utilized to inspect and/or repair of nuclear power plants and include the use of robotic manipulators or arms, none have been successfully utilized to facilitate the easy hand inspection of the primary bowl of the reactor by an operator or the inspection of the steam generator and associated tubing. Most of the above devices require the use of complex mechanical systems which must be controlled from a remote position.

There has been a long felt need for a versatile and all purpose nuclear power plant inspection device which can be used to inspect the reactor bowl, steam generator areas, tubing and ducts, and other areas within the nuclear power plant. There has also been a long felt need for an inspection device which is hand held and portable, which can be used to inspect large portions of the nuclear power plant, and which can be utilized for a variety of non-nuclear power plant applications.

SUMMARY OF THE INVENTION

In accordance with this long felt need, an inspection device and method are disclosed. In a most preferred embodiment, the invention comprises boom means for extending to a position to be inspected, and video camera means affixed to an end of said boom means for permitting the visual inspection of said position to be inspected.

In a second embodiment, the invention is directed to a nuclear power plant inspection device comprising boom means for extending to a position in a nuclear power plant to be inspected, and video camera means affixed to an end of said boom means for permitting the visual inspection of said position in said nuclear power plant to be inspected.

In another embodiment, the present invention comprises a device for inspecting the primary bowl of a nuclear reactor. The invention further comprises boom means for extending into the primary bowl of a nuclear reactor, and CCD video camera means affixed to the end of said boom means for visually inspecting said primary bowl.

The present invention is also directed to a method for inspecting portions of a nuclear power station. The method comprises the steps of extending a boom to a section of a power station to be inspected, said boom having a CCD camera attached thereto for permitting the visual inspection of said section to be inspected.

The device of the present invention can be utilized to inspect the primary bowl of the reactor, the steam generator, and other difficult to reach portions of a plant. The present invention is designed to be hand held and manipulated. It is further expandable by means of a plurality of telescoping members and can extend up to 32 feet.

The inspection device of the present invention, in a preferred embodiment, utilizes a charge-coupled video camera which facilitates the inspection of selected portions of the plant. In yet other embodiments, the inspection device includes means for maintaining the inspection device in a vertical position.

While a preferred embodiment and application of the present invention is directed toward nuclear power plant inspection, it is to appreciated that the inspection device of the present invention may be utilized for a large number of non-nuclear related applications, including inspection of chemical plants, oil refineries, waste treatment plants and facilities, fossil fuel burning electric power generation plants and other applications. These and other advantages of the present invention will become apparent from the detailed description and claims which follow.

DETAILED DESCRIPTION OF THE PRESENT INVENTION

The present invention is described with reference to the enclosed Figures wherein the same numbers are utilized where applicable. The present invention, in preferred embodiments, is directed to a device for inspecting portions of a nuclear power plant. However, it will be immediately apparent to those skilled in the art that the inspection device of the present invention is in no way limited to nuclear power plant inspection and may be utilized for a large number of non-nuclear related applications. Nonexclusive examples of potential alternative uses include the inspection of chemical plants, oil refineries, waste treatment plants, and coal and fossil fuel burning electric generation plants.

Figure 1:
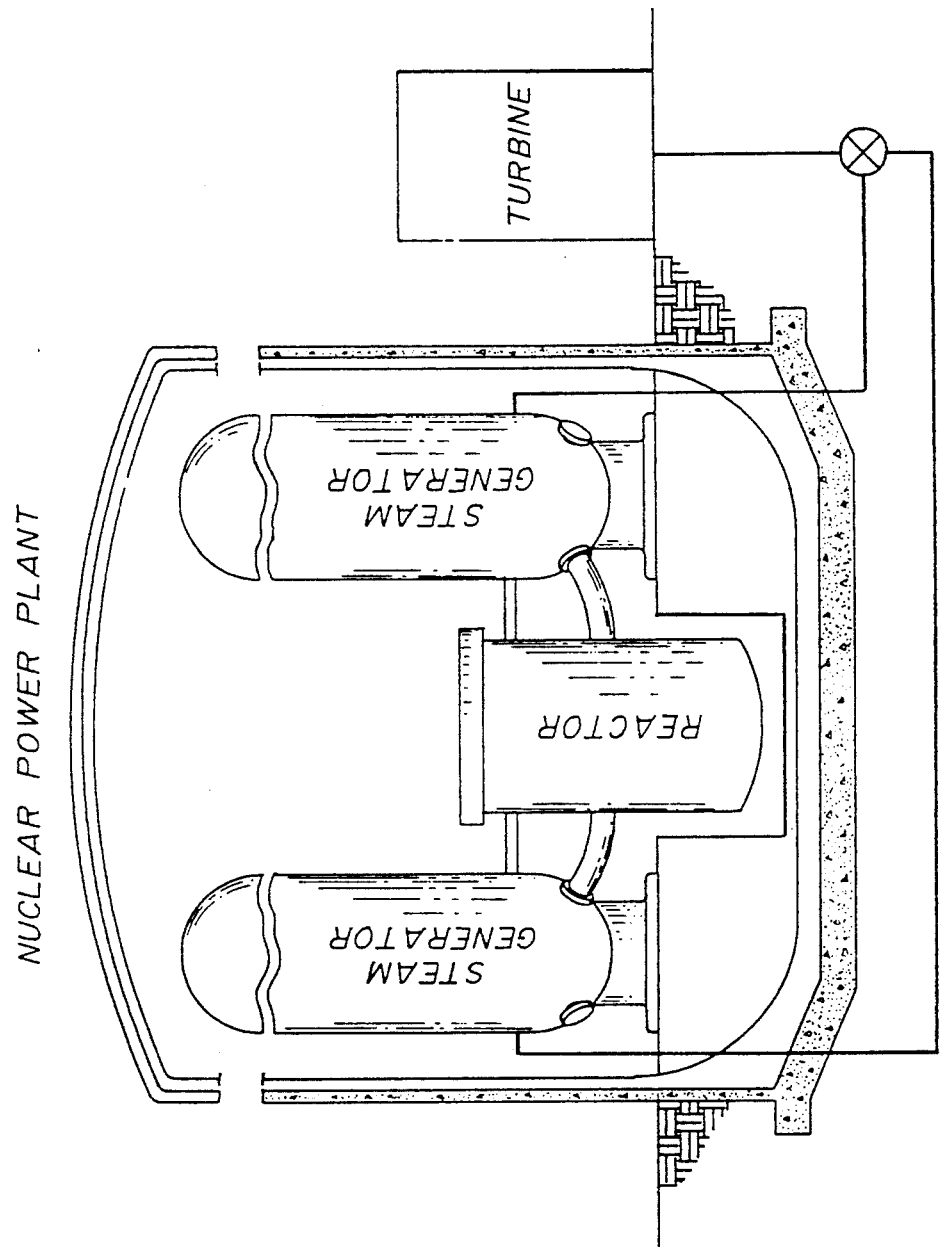
FIG. 1 is a representation of the components of a nuclear power plant.
Figure 2:
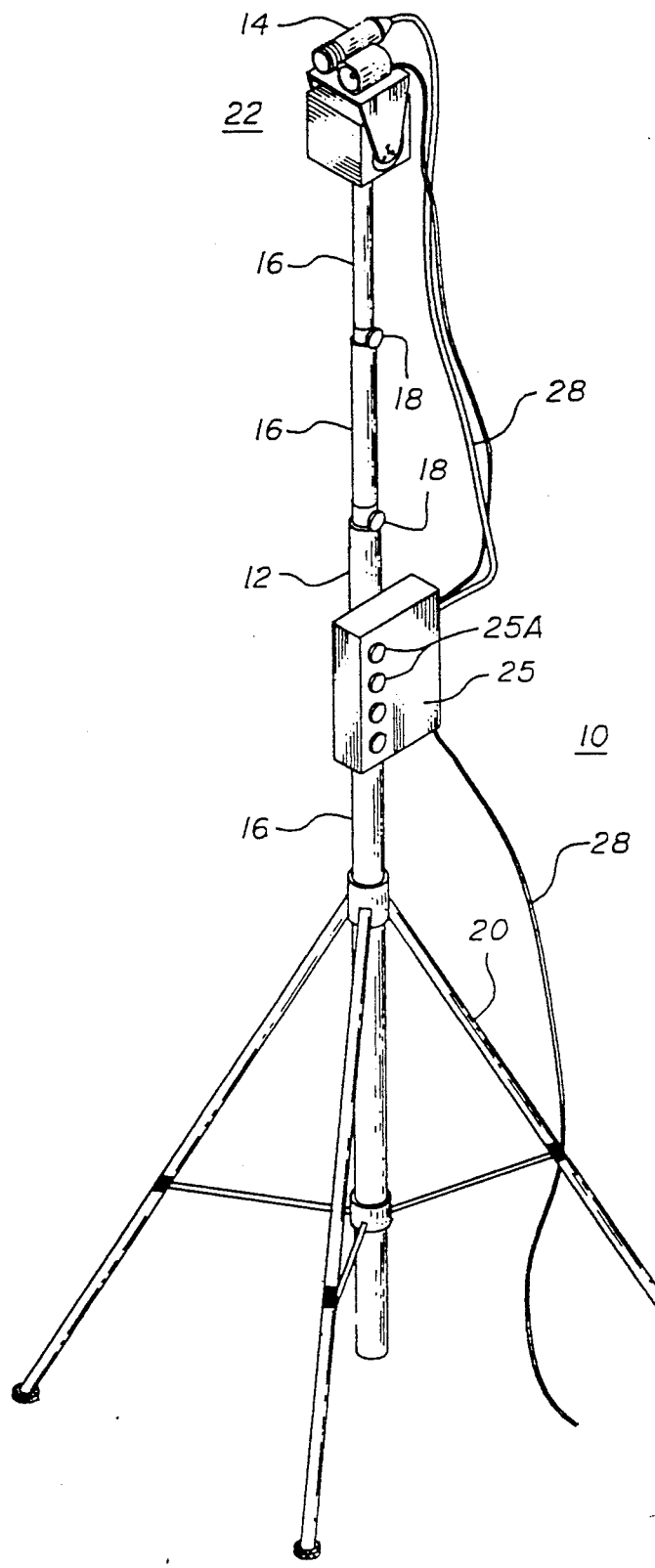
FIG. 2 is a perspective view of the hand-held inspection system of the present invention.

Referring to FIG. 2, the inspection device 10 of the present invention, in a most preferred embodiment, comprises a boom means 12 for extending to a position to be inspected. The boom means 12 is designed to be hand held and is affixed at a distal end to video camera means 14.

In a preferred embodiment, the boom means 12 comprises a plurality of telescoping members 16 which can be adjusted manually and mechanically locked to a fixed length by means of a plurality of locking means or clamps 18. In this manner, the length of the boom means 12 can be selectively adjusted. In a preferred embodiment, the boom means 12 should comprise enough telescoping members 16 to facilitate the expansion of the boom means a total length of about 32 feet. This length is sufficient to facilitate the full vertical examination of a nuclear steam generator and other difficult to reach positions of the plant.

As shown in FIG. 2, the device 10 of the present invention can be supported in a vertical position by means of a stand such as a tripod stand 20. Stand 20 permits the device to be retained in a selected position while, for example, the operator views a remote TV monitor to which the camera means is electrically interfaced so that images can be relayed to the remote TV monitor.

Figure 3:
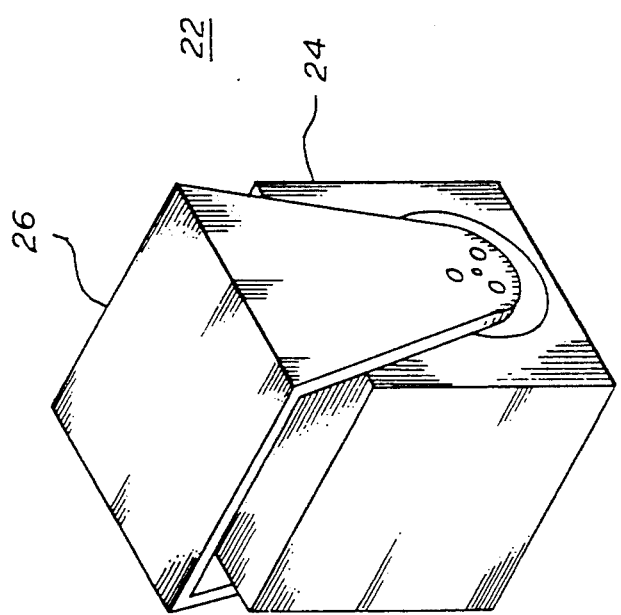
FIG. 3 is a prospective view of the pan and tilt mechanism utilized with the hand-held inspection system of the present invention.

As noted above, the distal end of the boom means 12 has affixed thereto a video camera means 14 attached to a pan and tilt mechanism 22. As shown in FIG. 3, the pan and tilt mechanism 22 comprises a box 24 with a tiltable pivoting member 26. The pivoting member 26 facilitates the approximate 180° vertical tilt of the video camera means 14. In a preferred embodiment, the video camera also should be able to pan 359°. In this manner, the video camera 14 can completely inspect a selected position or section of the plant.

The video camera means 14 preferably transmits video images to a TV monitor situated at a remote location. In a preferred embodiment, the video camera will incorporate CCD ("charge-coupled device") technology. The advent of CCD image transducers has permitted television cameras to be fabricated in very small sizes. The CCD detector assembly is positioned to receive optical images from the camera lens so that it can convert the components of the received image to corresponding electrical signals. Electrical circuitry associated with the detectors converts the image component signals to standard video signals for use by television receiver/monitors. In the present invention, the CCD circuitry may, for example, comprise Sony Model A-7560-026A, which functions to convert optical images received from a lens assembly into electrical video signals. The lens assembly of the preferred embodiment, may, for example, comprise Sony Model VCL08SBYA.

In an alternative embodiment, a small video receiver can be interfaced along the boom means 12 or on one of the telescoping members 16 and electrically interfaced to the camera means 14 so that a video image of the inspected area can be directly viewed by the user of the inspection device as he or she is inspecting the area. In a preferred embodiment, a small video receiver is, for example, a Sony WALKMAN which is clipped or otherwise mounted to a telescoping member 16 or the boom means 12. In the case when the small video receiver is directly attached to the inspection device, it may not be necessary to run electrical lines back to a remote location so that another individual can view the inspected area on a remote terminal. However, it would be possible to run additional lines back to a remote area so that both the person at a remote terminal and the individual actually performing the inspecting can simultaneously view the inspected area.

The video camera means 14 will also preferably incorporate an auto focus mechanism which, along with the pan and tilt means 24, may be controlled by a remote operator with a joy stick (not shown) at a remote location. As shown in FIG. 2, both the pan and tilt mechanism 22 and autofocus may alternatively be controlled by the operator of the inspection device by means of a control box 25 with activation buttons 25a attached to the boom means 12. A joystick may also be provided to control box 25 for easier manipulation of the camera means and pan and tilt by the operator of the inspection device. Furthermore, the control box may include controls to electromechanically extend the boom means 12 and telescoping members 16 to the desired length.

Figure 4:
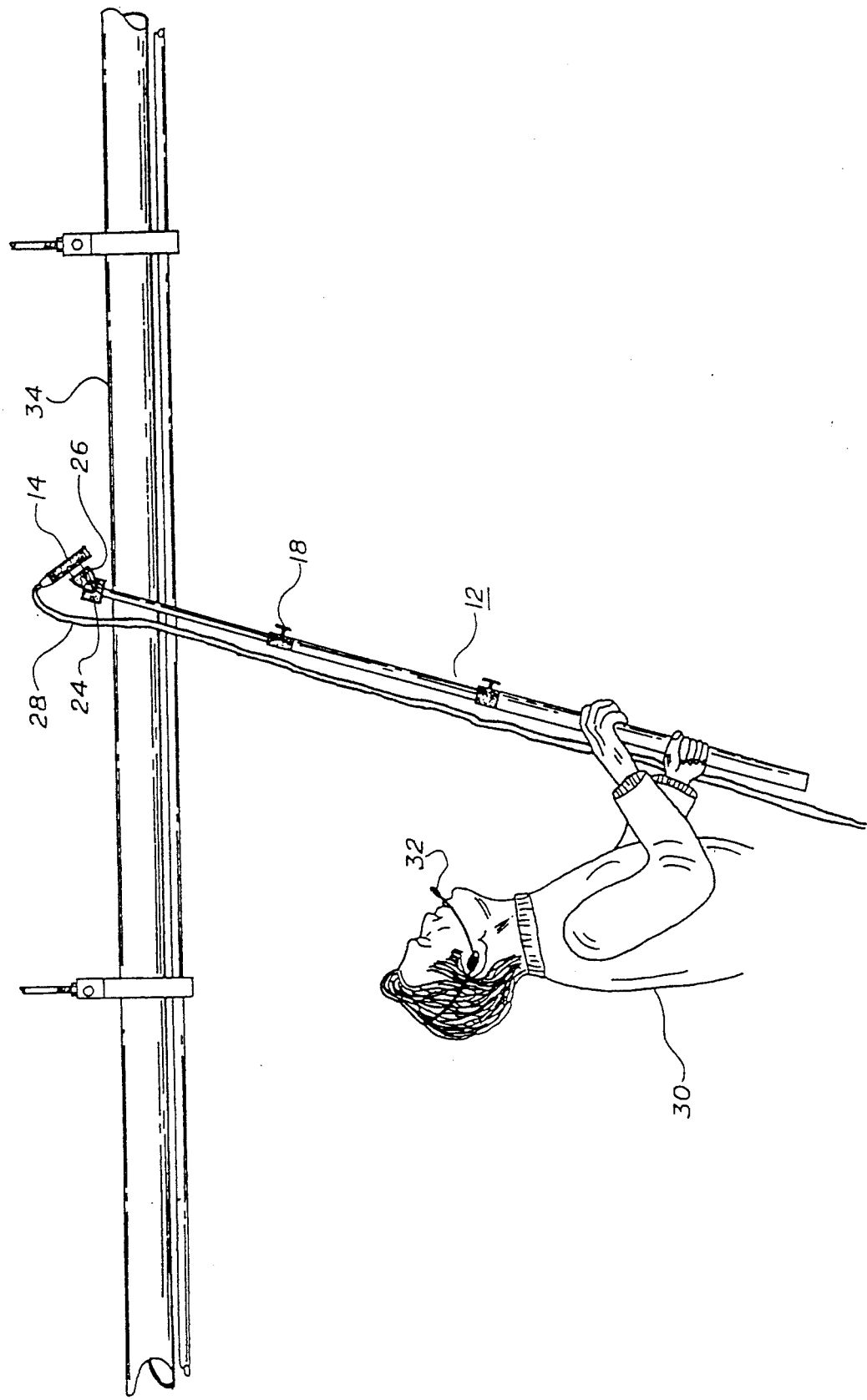
FIG. 4 is a perspective view of the hand-held inspection system of the present invention.

FIGS. 2 and 4 illustrate connecting cables 28 which facilitate the remote operation of the auto focus and pan and tilt mechanism 128. The cables 28 from the video camera led to the closed circuit TV monitor situated at a remote location.

In operation of the inspection device provided in accordance with the present invention, the length of the boom is initially adjusted by fixing the position of the telescoping member 16 with locking means 18 or alternatively extending the boom means with electromechanical controls. The boom means 12 with attached CCD video camera 14 is then extended to a position in the plant to be inspected. The CCD camera transmits an image via the cables 28 to a remote TV monitor, or to the video receiver attached to the boom means 12 or telescoping members 16. In another case, the position of the CCD camera can be changed by adjusting the pan and tilt mechanism 22 either remotely or by the activation of buttons situated on a hand control box 25 attached to the boom means 12. As shown in FIG. 4, the operator 30 may utilize a headset 32 where he can be directed into an appropriate position by a remote operator viewing the TV monitor at a remote location.

The device of the present invention can be utilized for a large number of applications in a nuclear power plant. For example, the device may be utilized to inspect the primary bowl of the reactor. In this case, the boom containing the CCD camera is lowered into the primary bowl of the reactor via a manhole. The CCD video camera attached to the end thereof is then adjusted via pan and tilt mechanism 22 to inspect various portions of the reactor bowl which is to be viewed and inspected. As shown in FIG. 4, the device of the present invention can also be utilized to inspect overhead piping and ductwork 34.

The present invention has been described with reference to the enclosed Figures. It is to be appreciated that other embodiments fulfill the spirit and scope of the present invention is to be determined with reference to the claims appended hereto.

What is claimed is:

1. A nuclear power plant inspection device comprising:
    telescoping boom means for extending said device to a difficult to reach position to be inspected within a nuclear power plant; and
    video camera means affixed to an end of said boom means for permitting the visual inspection of said difficult to reach position to be inspected within said nuclear power plant, said video camera means being further affixed to pan and tilt means attached to said end of said boom means.

2. The device of claim 1 wherein said video camera means is a charge-coupled device.

3. The device of claim 1 wherein said boom means comprises a plurality of telescoping members.

4. The device of claim 1 further comprising means for supporting said device in a vertical position.

5. The device of claim 1 further comprising a video receiver attached to the boom means for receiving video images of the inspected position.

6. A nuclear power plant inspection device comprising:
    hand-held telescoping boom means for extending to a difficult to reach position in a nuclear power plant to be inspected; and
    CCD means affixed to an end of said boom means for permitting the visual inspection of said position in said nuclear power plant to be to be inspected.

7. The device of claim 6 wherein said video camera is affixed to a pan and tilt mechanism attached to the end of said boom means.

8. The device of claim 6 wherein said video camera is a charge-coupled device.

9. The device of claim 7 wherein said pan and tilt means is controlled by a control box affixed to said boom means.

10. The device of claim 9 further comprising a video receiver attached to the boom means for viewing the inspected position by an operator of the inspection device.

11. A method for inspecting difficult to reach portions of a nuclear power station comprising:
    extending a telescoping hand-held boom to a difficult to reach position to be inspected within a nuclear power station, said boom having a CCD camera attached to an end thereof for permitting the visual inspection of said difficult to reach position to be inspected.

* * * * *

REEXAMINATION CERTIFICATE (3619th)

United States Patent
Brooks et al.

[11] B1 5,305,356
[45] Certificate Issued Sep. 1, 1998

[54] INSPECTION DEVICE

[75] Inventors: Raymond J. Brooks, Ontario; John M. Gay, Pittsford; Bruce A. Weir, Ontario; Paul E. McEntee, Rochester; Lauren Blood, Livonia Center, all of N.Y.

[73] Assignee: Brooks Support Systems, Inc., Williamson, N.Y.

Reexamination Request:
No. 90/004,168, Mar. 5, 1996

Reexamination Certificate for:
Patent No.: 5,305,356
Issued: Apr. 19, 1994
Appl. No.: 882,847
Filed: May 14, 1992

[51] Int. Cl.$^6$ .................................................. G21C 17/00
[52] U.S. Cl. .......................... 376/249; 376/248; 348/376
[58] Field of Search ................................ 376/248, 249; 224/908; 248/168, 179, 187, 188.5; 352/243; 354/81, 82; 358/906; 364/513, 525, 527; 368/209, 210, 226; 976/DIG. 210, DIG. 213; 348/83, 373, 375, 376

[56] References Cited

U.S. PATENT DOCUMENTS

| | | | |
|---|---|---|---|
| 4,420,455 | 12/1983 | Qurnell et al. | 376/245 |
| 4,505,874 | 3/1985 | Warren et al. | 376/249 |
| 4,664,873 | 5/1987 | Hendrich et al. | 376/260 |
| 4,728,839 | 3/1988 | Coughlan et al. | 310/112 |
| 4,746,977 | 5/1988 | White | 358/103 |
| 5,056,046 | 10/1991 | Mutchler et al. | 364/551.1 |
| 5,065,249 | 11/1991 | Horn et al. | 358/229 |

FOREIGN PATENT DOCUMENTS

63-163443   7/1988   Japan .

OTHER PUBLICATIONS

White et al., *Surveillance Robot for Nuclear Power Plants*, Proceedings of the 1985 Winter Meeting of the American Nuclear Society, San Francisco (Nov. 1985).

White et al., *A Mobile Robot for Power Plant Surveillance and Inspection*, Proceedings, 36th Conference on Remote Systems Technology, 1988, vol. 2.

Inuktun I–Ball, dated Mar. 19, 1991.

*Video Camera Use at Nuclear Power Plants*, EPRI NP–6882, Aug. 1990.

Werner Brettschuh and Heiner Siegert, "Reducing outage times at German BWRS," *Nuclear Engineering International*, Nov. 1987, pp. 42–44.

Camera Inspection and Retrieval (R. Brooks Associates), Sep. 1990.

Camera Inspection and Retrieval (R. Brooks Associates), Mar. 1991.

Remote Visual Inspection Services/Retrieval/Sampling/for Nuclear Power Plants (R. Brooks Associates), Feb. 1991.

Brochure, "Brook Videostick, Remote Inspection System for Maintenance Support," bearing copyright date 1991.

PCT Written Opinion, International (PCT) Application No. PCT/US93/04561, dated Apr. 4, 1994.

PCT International Preliminary Examination Report, International (PCT) Application No. PCT/US93/04561, dated Jul. 13, 1994.

EPO Examination report dated Feb. 27, 1996.

*Primary Examiner*—Daniel Wasil

[57] ABSTRACT

A device suited for inspecting selected positions of a nuclear power plant. The invention comprises a boom for extending to a position in a nuclear power station to be inspected, and a video camera affixed to the boom for permitting the visual inspection of the position to be inspected. In preferred embodiments, the video camera is affixed to a pan and tilt mechanism which may be adjusted by a remote joystick or by a control box situated on the boom. The video camera includes an auto-focus feature.

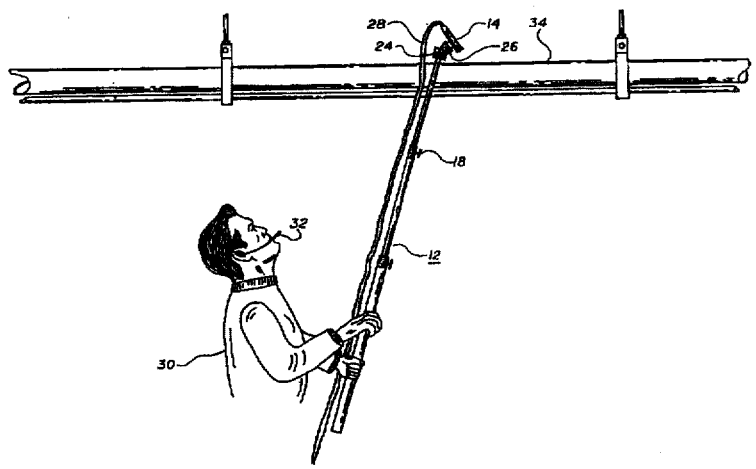

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 11 is confirmed.

Claims 1–10 are cancelled.

* * * * *